United States Patent
Watanabe et al.

(10) Patent No.: US 9,727,246 B2
(45) Date of Patent: Aug. 8, 2017

(54) MEMORY DEVICE, COMPUTER SYSTEM, AND METHOD OF CONTROLLING MEMORY DEVICE

(71) Applicant: Hitachi, Ltd., Tokyo (JP)

(72) Inventors: Satoru Watanabe, Tokyo (JP); Junji Ogawa, Tokyo (JP); Nagamasa Mizushima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 14/764,659

(22) PCT Filed: May 22, 2013

(86) PCT No.: PCT/JP2013/064163
§ 371 (c)(1),
(2) Date: Jul. 30, 2015

(87) PCT Pub. No.: WO2014/188528
PCT Pub. Date: Nov. 27, 2014

(65) Prior Publication Data
US 2015/0370488 A1      Dec. 24, 2015

(51) Int. Cl.
*G06F 12/00* (2006.01)
*G06F 3/06* (2006.01)
(Continued)

(52) U.S. Cl.
CPC .............. *G06F 3/0608* (2013.01); *G06F 3/06* (2013.01); *G06F 3/064* (2013.01); *G06F 3/0688* (2013.01);
(Continued)

(58) Field of Classification Search
CPC .......... G06F 3/0608; G06F 3/06; G06F 3/064; G06F 3/0688; G06F 12/0246; G06F 12/04; G06F 2212/401; G06F 2212/7207
See application file for complete search history.

(56) References Cited

U.S. PATENT DOCUMENTS 6,463,177 B1    10/2002   Li et al.
7,814,162 B2 *  10/2010   Raghunandan ........ G06Q 10/00
                                                    709/206
(Continued)

FOREIGN PATENT DOCUMENTS

JP       05-100941 A      4/1993
JP     2000-152171 A      5/2000
(Continued)

OTHER PUBLICATIONS

International Search Report of PCT/JP2013/064163.

*Primary Examiner* — Charles Rones
*Assistant Examiner* — Nanci Wong
(74) *Attorney, Agent, or Firm* — Mattingly & Malur, PC

(57) ABSTRACT

An example of the invention is a memory device including a controller and a plurality of randomly accessible memories that are capable of storing user data from a host. The controller includes data management information managing correspondence relations between address areas to be designated by the host and the plurality of memories, and compression policy management information managing associations of the address areas to be designated by the host with priorities in compressing user data to be stored in the plurality of memories. The controller is configured to determine a compression policy associated with a designated address area included in an access request from the host based on a priority associated with the designated address area and information on free space of the plurality of memories.

12 Claims, 14 Drawing Sheets

(51) Int. Cl.
*G06F 12/04* (2006.01)
*G06F 12/02* (2006.01)

(52) U.S. Cl.
CPC .......... *G06F 12/0246* (2013.01); *G06F 12/04* (2013.01); *G06F 2212/401* (2013.01); *G06F 2212/7202* (2013.01)

(56) References Cited

U.S. PATENT DOCUMENTS

| | | | | |
|---|---|---|---|---|
| 2005/0187777 | A1* | 8/2005 | Chevallier | H04W 88/181 704/500 |
| 2009/0161547 | A1* | 6/2009 | Riddle | G06F 9/526 370/236 |
| 2011/0066803 | A1* | 3/2011 | Arakawa | G06F 11/1088 711/114 |
| 2011/0145486 | A1* | 6/2011 | Owa | G06F 12/0246 711/103 |
| 2011/0264843 | A1* | 10/2011 | Haines | G06F 12/0246 711/103 |
| 2014/0337442 | A1* | 11/2014 | Zhuang | H04L 51/06 709/206 |
| 2014/0344536 | A1* | 11/2014 | Benisty | G06F 3/0659 711/159 |
| 2015/0058541 | A1 | 2/2015 | Owa et al. | |

FOREIGN PATENT DOCUMENTS

| | | |
|---|---|---|
| JP | 2003-015918 A | 1/2003 |
| JP | 2009-230513 A | 10/2009 |
| JP | 2011-048679 A | 3/2011 |
| JP | 2011-128792 A | 6/2011 |
| JP | 2013-030251 A | 2/2013 |

\* cited by examiner

106

| COMPRESSION PRIORITY MANAGEMENT TABLE ||
|---|---|
| 201 | 202 |
| DATA STORAGE AREA TYPE | COMPRESSION PRIORITY |
| INDEX<br>DATA<br>WORKING TABLE<br>⋮ | MIDDLE<br>HIGH<br>LOW<br>⋮ |

| DATA STORAGE AREA MANAGEMENT TABLE |||
|---|---|---|
| 301 | 302 | 303 |
| DATA STORAGE AREA NUMBER | DATA STORAGE AREA TYPE | LOGICAL ADDRESS |
| 0<br>1<br>2<br>⋮ | INDEX<br>DATA<br>WORKING TABLE<br>⋮ | 1000-2000<br>2001-3000<br>4001-4000<br>⋮ |

*Fig. 3*

| COMPRESSION POLICY MANAGEMENT TABLE ~119 | | |
| --- | --- | --- |
| ~401 | ~402 | ~403 |
| LOGICAL ADDRESS | COMPRESSION PRIORITY | COMPRESSION POLICY |
| 1000-2000<br>2001-3000<br>4001-4000<br>⋮ | MIDDLE<br>HIGH<br>LOW<br>⋮ | ASYNCHRONOUS COMPRESSION<br>SYNCHRONOUS COMPRESSION<br>NO COMPRESSION<br>⋮ |

Fig. 4

| COMPRESSED DATA MANAGEMENT TABLE ~118 | |
| --- | --- |
| ~501 | ~502 |
| LOGICAL ADDRESS | FLASH MEMORY NUMBER |
| 0-127<br>128-255<br>256-383<br>⋮ | 0, 11, 2<br>10, 4<br>5, 16, 7, 20<br>⋮ |

Fig. 5

121
UNCOMPRESSED DATA MANAGEMENT TABLE

| LOGICAL ADDRESS (601) | FLASH MEMORY NUMBER (602) |
|---|---|
| 1000-1015 | 56 |
| 1016-1031 | 9 |
| 1032-1047 | 99 |
| ⋮ | ⋮ |

Fig. 6

120
FLASH MEMORY MANAGEMENT TABLE

| FLASH MEMORY STATE (701) | FLASH MEMORY NUMBER (702) |
|---|---|
| COMPRESSED DATA | 1,2,3,4, ... |
| TO-BE COMPRESSED DATA | 102,203,304,405, ... |
| NOT-TO-BE COMPRESSED DATA | 12,13,14,15, ... |
| NO DATA | 101,202,303,404, ... |

MEMORY DEVICE, COMPUTER SYSTEM, AND METHOD OF CONTROLLING MEMORY DEVICE

BACKGROUND

This invention relates to a memory device, a computer system, and a method of controlling the memory device.

Data compression technology has been drawing more attention along with increase in volume of data to be processed by information systems. Data compression is to convert data into different data having a smaller volume while keeping information of the original data. The data compression is categorized as lossless compression or lossy compression. The lossless compression allows complete restoration of original data by decompressing the compressed data. The lossy compression does not allow complete restoration of original data even after decompressing the compressed data. The data compression referred to hereafter in the embodiments is lossless compression. For lossless compression, there have been known a large number of compression algorithms including Huffman coding.

As storage devices to store data for information systems, hard disk drives (hereinafter, abbreviated as HDDs) are widely used; however, non-volatile semiconductor memories, particularly flash memories (hereinafter, abbreviated as FMs), have come in use in recent years. Although FMs have smaller capacities than HDDs, flash memory boards including multiple FMs thereon can store a large volume of data. JP 2013-030251 A discloses an example of a storage device employing FMs.

Data compression is executed by a program running on a server apparatus. A database having compression functionality disclosed in JP 2003-015918 A operates on a server apparatus to compress data and store the data in a storage apparatus. The server apparatus retrieves compressed data from the storage apparatus and a program running on the server apparatus decompresses the compressed data.

Meanwhile, storage apparatuses implemented with data compression functionality are also known. For example, JP 2011-048679 A discloses a storage apparatus having a compression/decompression function. The storage apparatus receives a data write request from a server apparatus, compresses data, and stores the data to a storage medium. When receiving a data read request from a server apparatus, the storage apparatus decompresses data and sends the data to the server.

PATENT DOCUMENTS

1. JP 2013-030251 A
2. JP 2003-015918 A
3. JP 2011-048679 A

SUMMARY

Memory devices having compression functionality like flash memory boards with compression functionality have limitations in data volume the memory devices can store. Accordingly, in order to store data received from the host as much as possible, it is preferable that the memory device compress data at a higher compression ratio and store more data in the storage area.

In this connection, data compression and data decompression by a memory device require time to process the data, which causes delay in responding to a host. Furthermore, data compression and data decompression increase the load to the memory device, which might cause degradation in performance of the memory device.

Accordingly, desired is a technique to appropriately balance the performance of the memory device and the capacity of the memory device as seen from the host.

An aspect of this invention is a memory device including a controller and a plurality of randomly accessible memories that are capable of storing user data from a host. The controller includes data management information managing correspondence relations between address areas to be designated by the host and the plurality of memories, and compression policy management information managing associations of the address areas to be designated by the host with priorities in compressing user data to be stored in the plurality of memories. The controller is configured to determine a compression policy associated with a designated address area included in an access request from the host based on a priority associated with the designated address area and information on free space of the plurality of memories.

An aspect of this invention can appropriately balance the performance of a memory device and the capacity of the memory device as seen from the host.

BRIEF DESCRIPTION OF THE DRAWINGS

FIG. 2 is a diagram for illustrating a configuration example of a compression priority management table in Embodiment 1;

FIG. 3 is a diagram for illustrating a configuration example of a data storage area management table in Embodiment 1;

FIG. 4 is a diagram for illustrating a configuration example of a compression policy management table in Embodiment 1;

FIG. 5 is a diagram for illustrating a configuration example of a compressed data management table in Embodiment 1;

FIG. 6 is a diagram for illustrating a configuration example of a uncompressed data management table in Embodiment 1;

FIG. 7 is a diagram for illustrating a configuration example of a flash memory management table in Embodiment 1;

DETAILED DESCRIPTION OF THE EMBODIMENTS

Figure 1:
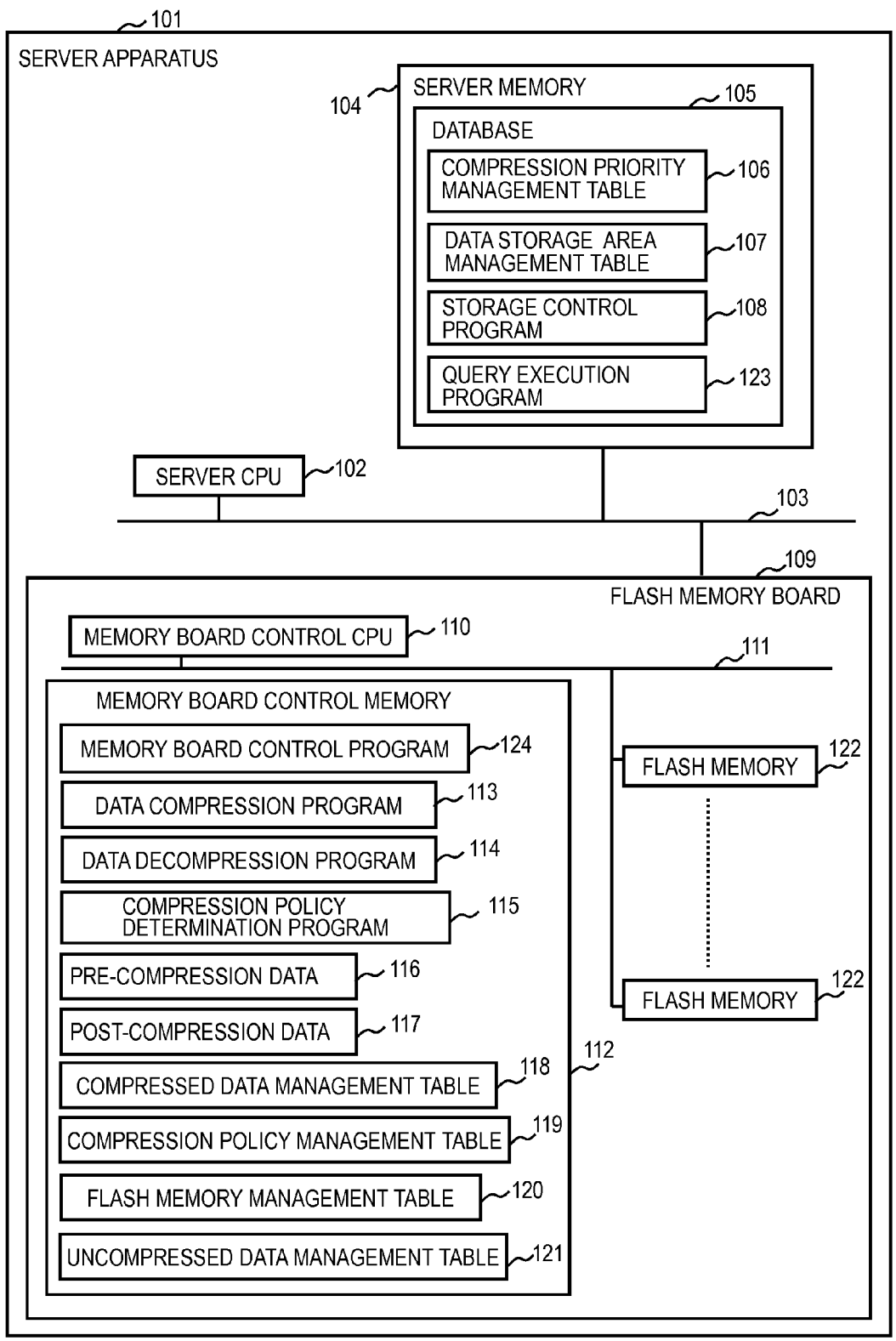
FIG. 1 is a block diagram for schematically illustrating a configuration example of a server apparatus including a flash memory board in Embodiment 1.

Hereinafter, embodiments of this invention are described with reference to the accompanying drawings. It should be noted that the embodiments are merely examples to implement this invention and are not to limit the technical scope of this invention. Unless specified otherwise, elements common to some of the drawings are denoted by the same reference signs.

Embodiment 1

This embodiment relates to a memory device having functionality for compressing user data received from a host (including a server CPU, a server memory, and a program in the example described in the following) and storing the data in a storage area. The following describes a flash memory board of an example of a memory device and a server apparatus (an example of a computer system) including the flash memory board.

The flash memory board includes a controller mounted on the board and individually accessible (randomly accessible) flash memories. In the following description, one flash memory can be one flash memory chip.

The flash memory board in this embodiment has a data compression/decompression function. The flash memory board in this embodiment determines the compression policy based on the logical address received from a host and the free space of the flash memory board. Specifically, the flash memory board determines the compression policy based on the value indicating free space, for example, the data volume expressed in bytes or bits or the percentage of the free space to the capacity. The value indicating free space is information (a value) about free space. In the example described in the following, the flash memory board uses the percentage of free space.

This embodiment enables balancing the performance of the flash memory board and the capacity for data to be received from an external and stored therein by selecting an appropriate compression policy based on the access characteristics of the user data in being accessed by applications running on a server apparatus and the value indicating the free space of the flash memory board.

In the example described in the following, the flash memory board selects one compression policy from three compression policies of synchronous compression, asynchronous compression, and no compression. The flash memory board holds information associating logical addresses to be designated by the host with compression priorities. The compression priorities represent request levels for data compression of user data (logical address areas for storing user data) and specified by the host (user). In the following, user data may be simply referred to as data.

A higher compression priority requests data compression at a sooner time and a higher compression ratio. Among the aforementioned three compression policies, the synchronous compression is compression performed sooner than the asynchronous compression and the synchronous compression and the asynchronous compression are compression at a higher compression ratio than the no compression.

The flash memory board associates compression priorities with compression policies. Accordingly, logical addresses are associated with compression policies via compression priorities. The flash memory board determines an association of a compression priority with a compression policy, that is, an association of a logical address area with a compression policy, in accordance with free space on the flash memory board. This prevents shortage of free space.

The flash memory board in this embodiment further has functionality of preventing data fragmentation caused by data compression. First, data fragmentation caused by data compression is explained. The following is an example in which the host compresses and decompresses data. When compressed data is partially updated, data fragmentation happens. Data fragmentation is a phenomenon that a series of data is stored at inconsecutive logical addresses.

When the host retrieves part of given compressed data from the storage, decompresses the retrieved data, updates the decompressed data, and recompresses the updated data, the compressed data after the update is different in size from the compressed data before the update. This causes data fragmentation.

For example, assume that the host writes a compressed series of data to an area at logical addresses 1 to 1000. The logical address is an address indicating a data storage location and is designated by the host to the flash memory board. The logical address is an address assigned to each data storage area having a specific size, for example 512 bytes, and may be also referred to as logical block address.

For example, assume that the host decompresses and updates 1 KB compressed data stored at the logical addresses 100 and 101 out of the 512 KB compressed data stored at the logical addresses 1 to 1000, and recompresses the updated data. Since the data is updated, the recompressed data size might be smaller than 1 KB.

For example, assume that the recompressed data size is 768 bytes and the host stores the recompressed data at the logical addresses 100 and 101. The latter half of 256 bytes in the data stored at the logical address 101 is unnecessary data.

Accordingly, to retrieve the compressed data stored at the logical addresses of 1 to 1000, the host needs to retrieve the logical address 1 to the 256th byte of the logical address 101, and to subsequently retrieve the logical address 102 to the logical address 1000. As noted from this example, generating unnecessary data (from the 257th byte to the 512th byte of the logical address 101) in a series of data first stored at the logical addresses 1 to 1000 is an example of data fragmentation.

In another example, when the host decompresses and updates 1 KB data at the logical addresses 100 and 101 and recompresses the updated data, the recompressed data size could be larger than 1 KB. For example, assume that the recompressed data size is 2 KB. In this case, the recompressed data cannot be stored at the logical addresses 100 and 101. The host needs to store the data at other logical addresses, for example, the logical addresses 1001 to 1004.

To retrieve the compressed data stored at the logical addresses 1 to 1000 before the update, the host needs to retrieve the logical addresses 1 to 99, then retrieve the logical addresses 1001 to 1004, and further retrieve the logical addresses 103 to 1000. As noted from this example, the phenomenon that a series of data originally stored at consecutive logical addresses are stored at inconsecutive logical addresses is also an example of data fragmentation.

As described above, when compressed data is partially updated, data fragmentation that stores data at inconsecutive logical addresses can happen.

The flash memory board in this embodiment manages logical addresses in association with flash memory numbers, so that the flash memory board can locate the flash memory holding the data designated with a logical address. The flash memory board further stores a termination identifier or a next flash memory number to each flash memory, in addition to user data (also referred to as data) from a host. This approach prevents data fragmentation caused by update of compressed data.

For example, assume that the host designates logical addresses 1 to 1000 to store user data and the flash memory compresses the user data received from the host to store the user data to flash memories. When the user data at the logical addresses 100 and 101 is updated, the data size after the update might be smaller than the data size before the update.

The flash memory board in this embodiment stores the user data together with a termination identifier to the flash memory to store the data for the logical address 101. The termination identifier is an identifier indicating the end of the user data in the flash memory. With this termination identifier, the flash memory board can retrieve all data by retrieving data at the logical addresses 1 to 1000 even if the data size is decreased by updating part of the user data.

For another example, assume that the host updates user data at the logical addresses 100 and 101 and the data size after the update is larger than the data size before the update. The flash memory board in this embodiment increases the flash memories to store the user data for the logical addresses 100 and 101.

The flash memory board stores a flash memory number (a next flash memory number) of the flash memory to store the latter part of the user data for the logical address 101 to the flash memory to store the former part of the user data for the logical address 101. As a result, even if the data size is increased by updating part of the user data, the flash memory board can retrieve all data only by retrieving data at the logical addresses 1 to 1000.

Hereinafter, this embodiment is described specifically with reference to the drawings. FIG. 1 is a block diagram for illustrating a configuration example of a server apparatus including a flash memory board in this embodiment. The flash memory board is a memory device for storing user data received from the host.

The server apparatus 101 is a server CPU 102 of a system processor, a server memory 104 of a system main memory, and a flash memory board 109. These are connected by a data transfer bus 103 to be able to communicate with one another. An example of the server memory 104 is a volatile semiconductor memory.

The server memory 102 stores programs to be executed by the server CPU 102. In the example of FIG. 1, the server memory 104 stores a database 105 of a data processing program. The database 105 includes a compression priority management table 106 and a data storage area management table 107.

The compression priority management table 106 manages associations of types of data storage areas with compression priorities. The user sets information to the compression priority management table 106. Data storage areas are defined with logical addresses. A storage area defined with a logical address is associated with a physical storage area on the flash memory board 109. The type of a storage area means the type of the data stored in the data storage area.

The data storage area management table 107 manages associations of types of data storage areas with logical addresses specifying data storage areas. The logical addresses are addresses used by the database 105 (the server CPU 102) or the host in accessing the flash memory board 109.

The server memory 104 further stores a storage control program 108 and a query execution program 123. The storage control program 108 sends instructions to the flash memory board 109. The query execution program 123 retrieves user data stored in the flash memory board 109 and updates the user data.

The flash memory board 109 includes a memory board control CPU 110 of a processor, a memory board control memory 112 of a main memory, and a plurality of flash memories 122. These are connected by a data transfer bus 111 to be able to communicate with one another.

The flash memories 122 are non-volatile semiconductor storage devices. One flash memory 122 is one or more flash memory chips or a part of the storage area of one flash memory chip. The flash memory board 109 individually (randomly) accesses the plurality of flash memories 122. That is to say, the flash memory board 109 can select and access any one of the flash memories 122. The flash memories 122 are identified with flash memory numbers. The flash memory numbers are identifiers of the flash memories 122.

The memory board control memory 112 stores programs to be executed by the memory board control CPU 110 and information to be used by the programs and further, stores compressed user data and uncompressed user data on a temporal basis. In FIG. 1, the memory board control memory 112 stores a memory board control program 124, a data compression program 113, a data decompression program 114, and a compression policy determination program 115.

The memory board control program 124 sends and receives data between the server memory 104 and the flash memory board 109. The data compression program 113 compresses user data received from the host. The data decompression program 114 decompresses compressed data retrieved from the flash memories 122. The compression policy determination program 115 determines the manner of compressing user data.

Furthermore, the memory board control memory 112 stores user data before being compressed (pre-compression data) 116 and user data after being compressed (post-compression data) 117 on a temporal basis. The memory board control memory 112 also stores a compressed data management table 118, a compression policy management table 119, a flash memory management table 120, and an uncompressed data management table 121.

The compressed data management table 118 manages correspondences between logical addresses of compressed data and flash memories. The compression policy management table 119 manages compression policies determined by the compression policy determination program 115. The flash memory management table 120 manages usages of the flash memories. The uncompressed data management table 121 manages associations of logical addresses of data which is not compressed with flash memories.

The programs are executed by the processor (CPU) to perform predetermined processing. Accordingly, a description having a subject of program in this embodiment or other embodiments may be replaced by a description having a subject of processor. Otherwise, processing performed by a program is processing performed by the apparatus and the system which run the program.

The processor operates in accordance with a program to work as a functional unit (means) to implement a predetermined function. For example, the processor operates in accordance with the storage control program 108 to function as a storage controller or operates in accordance with the memory board control program 124 to function as a memory board controller. The same applies to the other programs. Moreover, the processor also works as functional units to implement different processing executed by each program. The apparatus and the system are an apparatus and a system including these functional units.

In the following description, information used in the embodiments is described in the forms of tables. However, the information does not need to be expressed in the data structure of table, but may be expressed in the data structures of list, DB, queue, and the like. To describe the substance of information, terms such as identification information, identifier, name, ID, and number can be used, but they can be replaced with one another.

FIG. 2 depicts a configuration example of the compression priority management table 106 included in the database 105. The compression priority management table 106 has a data storage area type column 201 and a compression priority column 202. The data storage area type column 201 stores identifiers of data storage area types. The data storage area types are the types of data stored in data storage areas. The types of data defined in the database 105 include data, index, and working table. The information in the compression priority management table 106 is specified by the user.

The compression priority column 202 stores values of compression priorities associated with the data storage area types. In the example of FIG. 2, if the type of a data storage area is "working table", the compression priority is low. If the type of a data storage area is "data" (user data for the database 105), the compression priority is high. Different compression priorities are assigned different compression policies. Data in a storage area with a higher compression priority is compressed sooner.

For example, data required to have high responsiveness can show faster retrieval response when the data is not compressed. Preferably, such data is to be assigned a low compression priority from the viewpoint of performance. In the example of FIG. 2, the "working table" is assigned a compression priority of "low".

Data to be read or rewritten frequently is probably retrieved from the flash memory board 109 as soon as being fed to the flash memory board 109. Preferably, such data is to be assigned a comparatively low compression priority from the viewpoint of performance. In the example of FIG. 2, the "index" is assigned a compression priority of "middle".

FIG. 3 depicts a configuration example of the data storage area management table 107 included in the database 105. The data storage area management table 107 has a data storage area number column 301, a data storage area type column 302, and a logical address column 303.

A data storage area number 301 is a serial number assigned to a data storage area managed by the database 105 and an identifier of the data storage area in the database 105. The data storage area type column 302 stores the type of the data stored in the data storage area. The logical address column 303 stores the logical address specifying the data storage area, in this example, with the start logical address and the end logical address.

The database 105 receives inputs of, for example, data area types and sizes of required storage areas from the user and allocates selected data storage area numbers and logical address areas to individual data area types.

The query execution program 123 receives an SQL command from the user, determines the data storage area number 301 and the logical address 303 to input or output data, executes the SQL command, and outputs an execution result of the SQL command.

The storage control program 108 performs data input/output based on the logical address area determined by the query execution program 123.

The storage control program 108 determines the compression priority for the logical address area based on the compression priority management table 106 and the data storage area management table 107 and sends the determination to the memory board control program 124 in the flash memory board 109. The memory board control program 124 stores the information received from the storage control program 108 to the compression policy management table 119.

FIG. 4 depicts a configuration example of the compression policy management table 119 held by the flash memory board 109. The compression policy management table 119 has a logical address column 401, a compression priority column 402, and a compression policy column 403.

The logical address column 401 stores logical addresses specifying storage areas (logical address areas) in the flash memory board 109. The compression priority column 402 stores compression priorities associated with the individual storage areas indicated in the logical address column 401. The compression policy column 403 stores values indicating compression policies associated with the compression priorities.

FIG. 4 is an example of a compression policy management table 119 with default settings. The compression policy determination program 115 receives information of the compression priority management table 106 from the database and sets values to the logical address column 401 and the compression priority column 402. The compression policy determination program 115 holds information on default associations of compression priorities with compression policies. The compression policy determination program 115 sets values to the compression policy column 403 in accordance with the information.

As will be described later, the compression policy determination program 115 changes the compression policies associated with compression priorities in the compression policy column 403 based on the percentage of total free space of the flash memories 122.

In this example, the compression policies defined in the compression policy management table 119 are the following three compression policies: synchronous compression, asynchronous compression, and no compression. The defined compression policies include "no compression" meaning that the data is not to be compressed. The synchronous compression is to receive data the storage control program 108 sends from the server memory 104, compress the data, and store the data to the flash memories 122.

The asynchronous compression is to store data received from the server memory (host) 104 to the flash memories 122 without compressing the data, retrieve the data from the flash memories 122 later, compress the data, and writes the data again to the flash memories 122. The load to the flash memory board 109 can be controlled by compressing the data when the load to the flash memory board 109 is low The logical address column 401 and the compression priority column 402 store the information the memory board control program 124 receives from the storage control program 108. The compression policy column 403 stores default values or values indicating compression policies that the compression policy determination program 115 has changed from the default values. The method of determining compression policies for the compression policy determination program 115 will be described later.

FIG. 5 depicts a configuration example of the compressed data management table 118 held by the flash memory board 109. The compressed data management table 118 indicates logical addresses of compressed data and flash memories 122 holding the compressed data.

The compressed data management table 118 has a logical address column 501 and a flash memory number column 502. The logical address column 501 stores logical addresses specifying storage areas holding compressed data. In this example, each entry indicates a logical address area having the same size.

The flash memory number column 502 stores flash memory numbers of the flash memories 122 actually holding the compressed data of the individual entries. In the example of FIG. 5, the flash memory of the first number in each entry stores the data at the start logical address of the entry. The order of the other flash memory numbers does not need to correspond to the sequence of the logical address.

The size of compressed data depends on the data; accordingly, the numbers of flash memory numbers are not the same among the entries. The sizes of logical address areas may be different among the entries. In the example of FIG. 5, one flash memory number is stored in only one entry. That is to say, one flash memory 122 stores only user data in the logical address area of one entry.

FIG. 6 depicts a configuration example of the uncompressed data management table 121 held by the flash memory board 109. The uncompressed data management table 121 indicates logical addresses of uncompressed data and flash memories 122 holding the uncompressed data.

The uncompressed data management table 121 has a logical address column 601 and a flash memory number column 602. The logical address column 601 stores logical addresses specifying storage areas holding uncompressed data. In this example, each entry indicates a logical address area having the same size.

The flash memory number column 602 stores flash memory numbers of the flash memories 122 actually storing the uncompressed data of the individual entries. In the example of FIG. 6, each entry is assigned only one flash memory. In this example, the capacities of the flash memories 122 are the same. Each entry may indicate a larger logical address area or a plurality of flash memory numbers. The memory board (memory device) used in this embodiment or other embodiments may include non-volatile or volatile memory devices different from flash memory devices.

FIG. 7 depicts a configuration example of the flash memory management table 120 held by the flash memory board 109. The flash memory management table 120 has a flash memory state column 701 and a flash memory number column 702.

The flash memory state column 701 indicates states of flash memories. The states a flash memory can take are "compressed data", "to-be compressed data", "not-to-be compressed data", and "no data". The flash memory number column 702 stores flash memory numbers of the flash memories 122 being in the individual states listed in the flash memory state column 701.

Specifically, the entry of "compressed data" stores the flash memory numbers of the flash memories holding compressed user data. The entry of "to-be compressed data" stores the flash memory numbers of the flash memories holding user data that are to be compressed asynchronously but currently is not compressed.

The entry of "not-to-be compressed data" stores the flash memory numbers of the flash memories holding user data which is not to be compressed. The entry of "no data" stores the flash memory numbers of the flash memories not holding user data.

Figure 8:
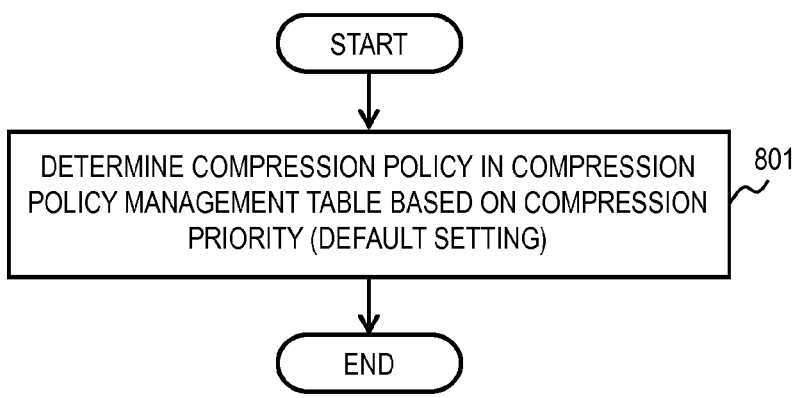
FIG. 8 is a flowchart for illustrating operation of an compression policy determination program in Embodiment 1.

FIG. 8 is a flowchart of the operation of the compression policy determination program 115. The flowchart of FIG. 8 depicts the operation of the compression policy determination program 115 to determine the compression policy (column 403) in an entry of the compression policy management table 119. When the memory board control program 124 stores a logical address area (column 401) and a compression priority (column 402) in a new entry of the compression policy management table 119 or when the memory board control program 124 updates an entry of the compression policy management table 119, the compression policy determination program 115 starts the operation.

If the added or updated entry in the compression policy management table 119 has a value "high" in the compression priority column 402, the compression policy determination program 115 stores a value "synchronous compression" in the compression policy column 403. If the value in the compression priority column 402 is "middle", the program 115 stores a value "asynchronous compression" in the compression policy column 403. If the value in the compression priority column 402 is "low", the program 115 stores a value "no compression" in the compression policy column 403. These relations between compression priorities and compression policies are default settings.

Figure 9A:
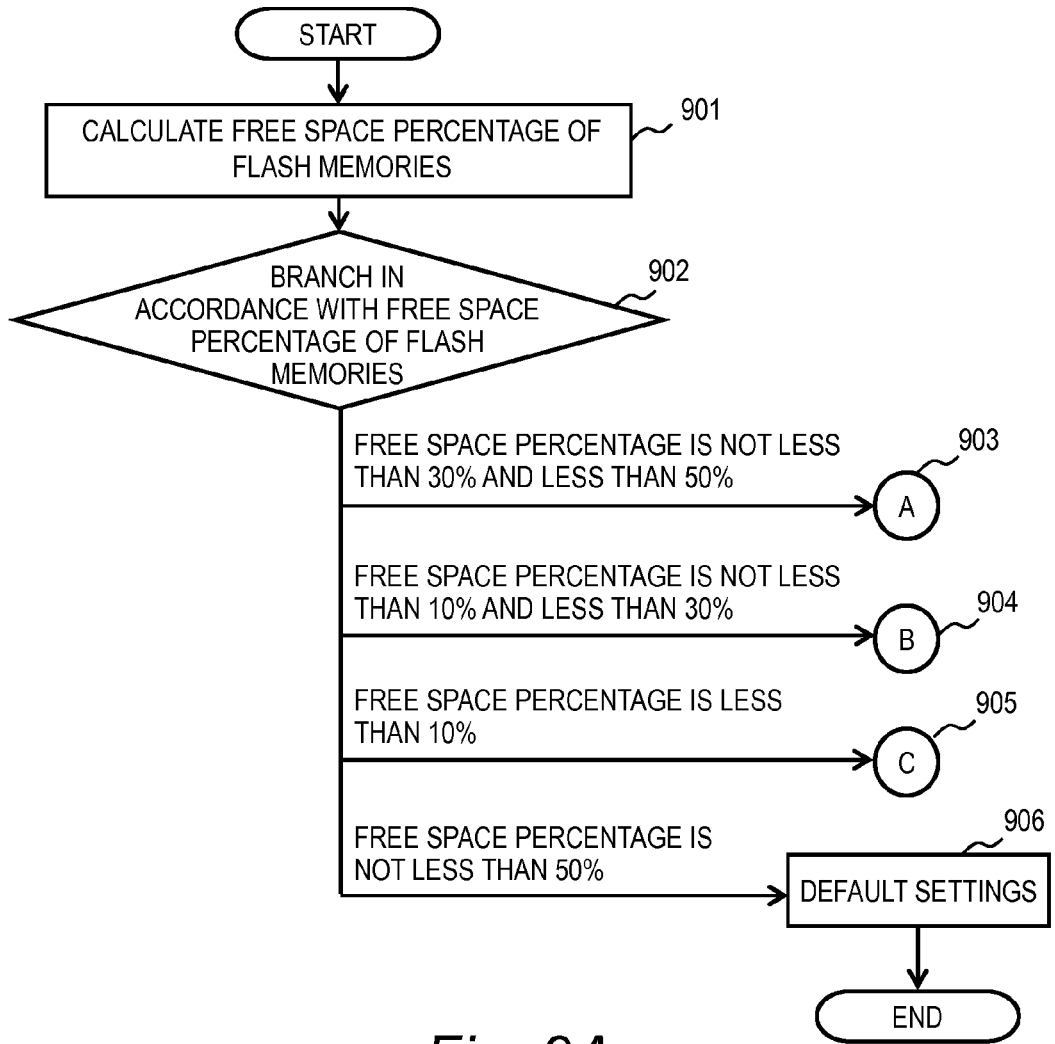
FIG. 9A is a flowchart for illustrating operation of the compression policy determination program in Embodiment 1 to redetermine compression policies based on free space.

FIG. 9A is a flowchart of the operation of the compression policy determination program 115. The flowchart of FIG. 9A depicts the operation of the compression policy determination program 115 to redetermine the compression policies in the entries of the compression policy management table 119 based on the compression priorities in the entries and the free space percentage of the flash memory board 109.

The compression policy determination program 115 starts this operation each time a predetermined time has passed, for example. First at Step 901, the compression policy determination program 115 calculates the percentage of total free space of the plurality of flash memories 122 on the flash memory board 109.

Referring to the flash memory management table 120, the compression policy determination program 115 divides the number of flash memories in the state of "no data" by the total number of flash memories on the flash memory board 109 to calculate the percentage of total free space (hereinafter, also referred to as free space percentage) of the plurality of flash memories 122.

Next, at Step 902, the compression policy determination program 115 determines the next step to proceed in accordance with the free space percentage calculated at Step 901. If the free space percentage is not less than 30% and less than 50%, the compression policy determination program 115 proceeds to Step 903.

If the free space percentage is not less than 10% and less than 30%, the compression policy determination program 115 proceeds to Step 904. If the free space percentage is less than 10%, the compression policy determination program 115 proceeds to Step 905.

If the free space percentage is not less than 50%, the compression policy determination program 115 sets the values in the compression policy column 403 of the compression policy management table 119 at default values. Thereafter, the compression policy determination program 115 terminates the operation of this flowchart. It should be noted that the foregoing numerical values of free space percentage for criteria are an example; they may be other numerical values.

Figure 9B:
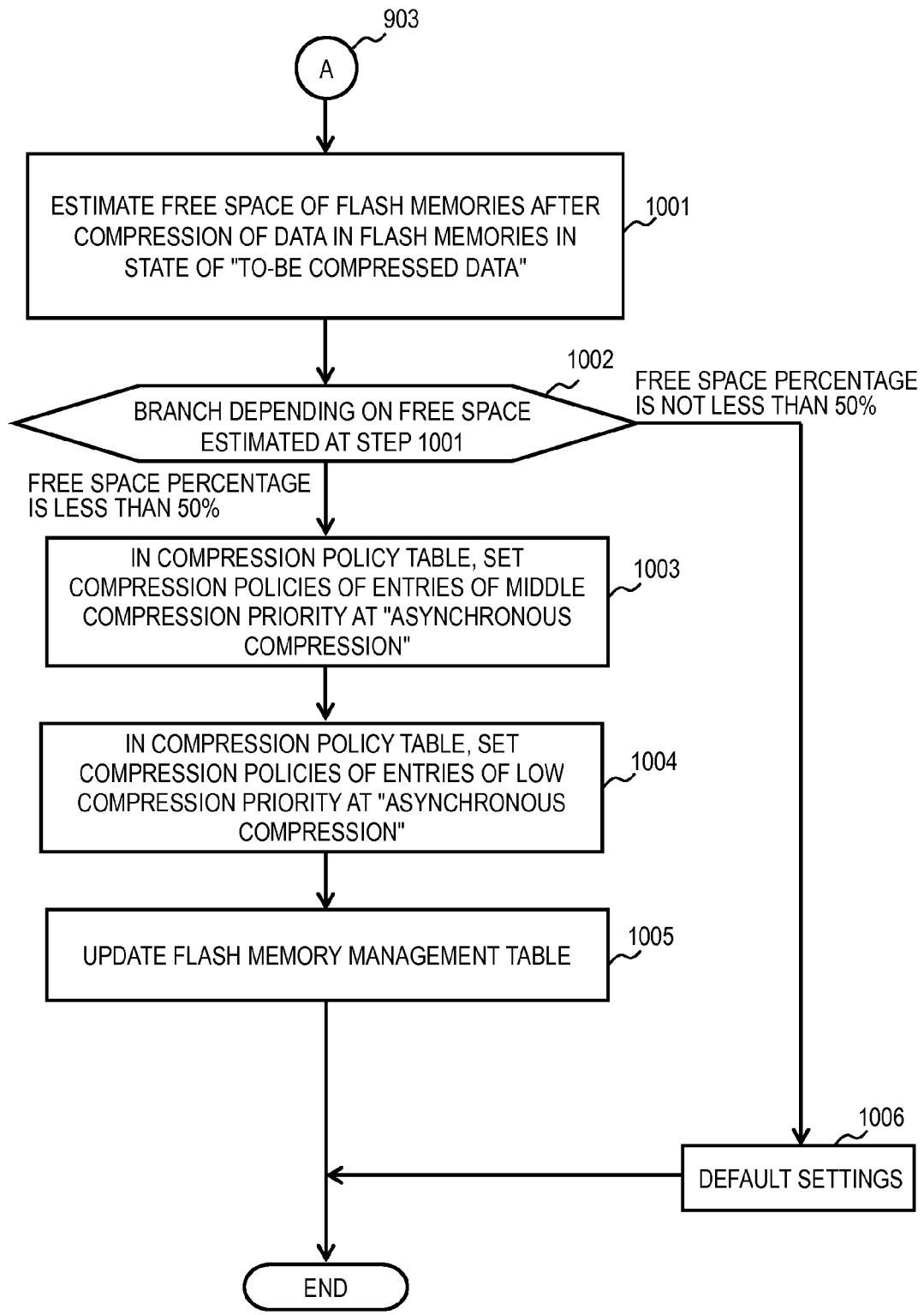
FIG. 9B is a flowchart for illustrating operation of the compression policy determination program in Embodiment 1 to redetermine compression policies when the free space percentage is not less than 30% and less than 50%.

The flowchart of FIG. 9B depicts the operation of the compression policy determination program 115 subsequent to Step S903 in the flowchart of FIG. 9A. That is to say, the flowchart of FIG. 9B depicts the operation of the compression policy determination program 115 to redetermine the compression policies in the case where the free space percentage is not less than 30% and less than 50%. This free space determination level is the second level from the top in the size of the free space.

At Step 1001, referring to the flash memory management table 120, the compression policy determination program 115 estimates the free space after compression of all the data in the flash memories of the entries in which the flash memory state column 701 indicates a value "to-be compressed data". The free space after data compression is obtained by adding the free space to be increased by the data compression to the free space before the data compression. As mentioned above, the free space before data compression is the total capacity of the flash memories 122 in the state of "no data".

For example, referring to the flash memory management table 120, the compression policy determination program 115 acquires the number of flash memories from the entry including the value "to-be compressed data" in the flash memory state column 701. The compression policy determination program 115 assumes that data compression reduces the data size to a predetermined fraction (specified fraction) of the data size before the compression.

The compression policy determination program 115 calculates the free space to be increased by the compression using (number of flash memories in the state of "to-be compressed data")×(capacity of one flash memory)×(1−specified fraction). The sum of the free space to be increased by the compression and the free space before the compression is the free space after the compression.

For example, it is assumed that the data size is reduced to a half by compression. Assuming that data should be stored to a half of the flash memories in the state of "to-be compressed data" in the flash memory management table 120 and the remaining half of the flash memories will change into the state of "no data", the compression policy determination program 115 calculates the total free space of the flash memories 122 in the state of "no data"

Next, at Step 1002, the compression policy determination program 115 chooses the next step depending on the free space calculated at Step 1001. If the free space calculated at Step 1001 is not less than 50%, the compression policy determination program 115 proceeds to Step 1006. At Step 1006, the compression policy determination program 115 sets the values in the compression policy column 403 of the compression policy management table 119 at default values. Thereafter, the compression policy determination program 115 exits this flowchart.

If the free space calculated at Step 1001 is less than 50%, the compression policy determination program 115 proceeds to Step 1003. At Step 1003, the compression policy determination program 115 sets, in the compression policy management table 119, the values in the compression policy column 403 of the entries having a value "middle" in the compression priority column 402 at "asynchronous compression".

At Step 1004, the compression policy determination program 115 sets, in the compression policy management table 119, the values in the compression policy column 403 of the entries having a value "low" in the compression priority column 402 at "asynchronous compression".

At Step 1005, the compression policy determination program 115 moves a part of the flash memory numbers in the entry of the state of "not-to-be compressed data" in the flash memory management table 120 to the entry of the state of "to-be compressed data" to be consistent with Step 1004 and exits this flowchart.

The foregoing operation can avoid an unnecessary change of compression policy by not changing the compression policies if the free space reaches a specified size after the data in the state of "to-be compressed data" is compressed. The foregoing operation can prevent steep increase in load caused by data compression by not compressing the data in the state of "to-be compressed data" immediately but by waiting for normal asynchronous compression.

The foregoing operation can increase the free space later by changing the compression policy for the logical address areas in the state of "not-to-be compressed data" to "asynchronous compression". The asynchronous compression distributes the load over time compared with synchronous compression, achieving less effect on the performance of the flash memory board 109.

Figure 9C:
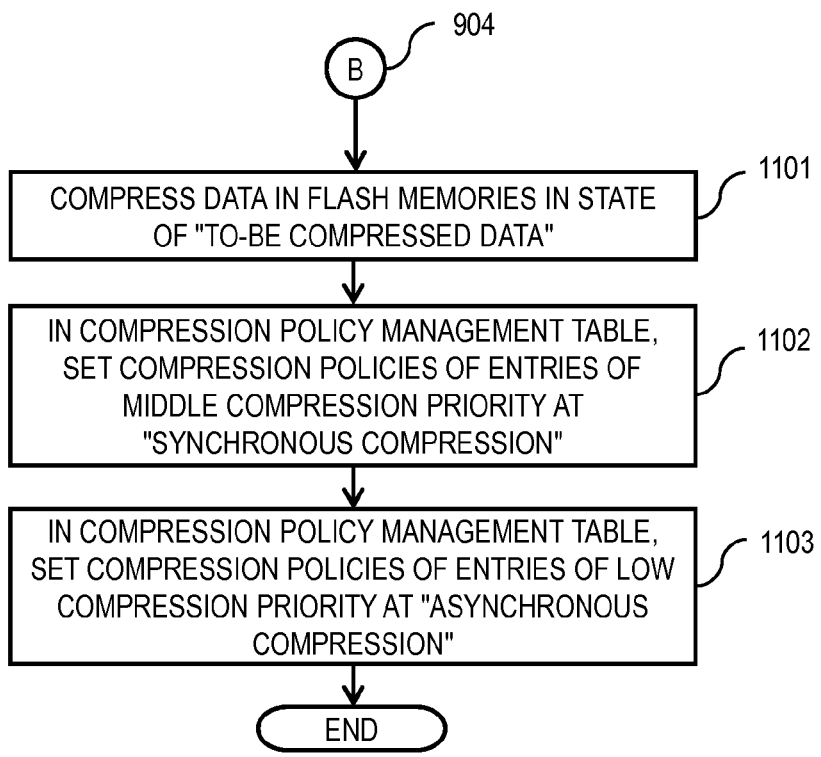
FIG. 9C is a flowchart for illustrating operation of the compression policy determination program in Embodiment 1 to redetermine compression policies when the free space percentage is not less than 10% and less than 30%.

The flowchart of FIG. 9C depicts the operation of the compression policy determination program 115 subsequent to Step S904 in the flowchart of FIG. 9A. That is to say, the flowchart of FIG. 9C depicts the operation of the compression policy determination program 115 to redetermine the compression policies in the case where the free space percentage is not less than 10% and less than 30%. This free space determination level is the third level from the top in the size of the free space.

At Step 1101, referring to the flash memory management table 120, the compression policy determination program 115 locates the flash memories 122 in the state of "to-be compressed data" and compresses the data in the located flash memories 122. The method of compressing the data will be described later.

At Step 1102, the compression policy determination program 115 sets the values in the compression policy column 403 of the entries having a value "middle" in the compression priority column 402 in the compression policy management table 119 at "synchronous compression".

At Step 1103, the compression policy determination program 115 sets the values in the compression policy column 403 of the entries having a value "low" in the compression priority column 402 in the compression policy management table 119 at "asynchronous compression".

The foregoing operation can immediately increase the insufficient free space by immediately compressing the data in the state of "to-be compressed data". Compared to the operation depicted in FIG. 9B, the foregoing operation can further increase the free space later by setting the compression policy for the logical address areas having a low compression priority at "asynchronous compression" and setting the compression policy for the logical address areas having a middle compression priority at "synchronous compression".

Figure 9D:
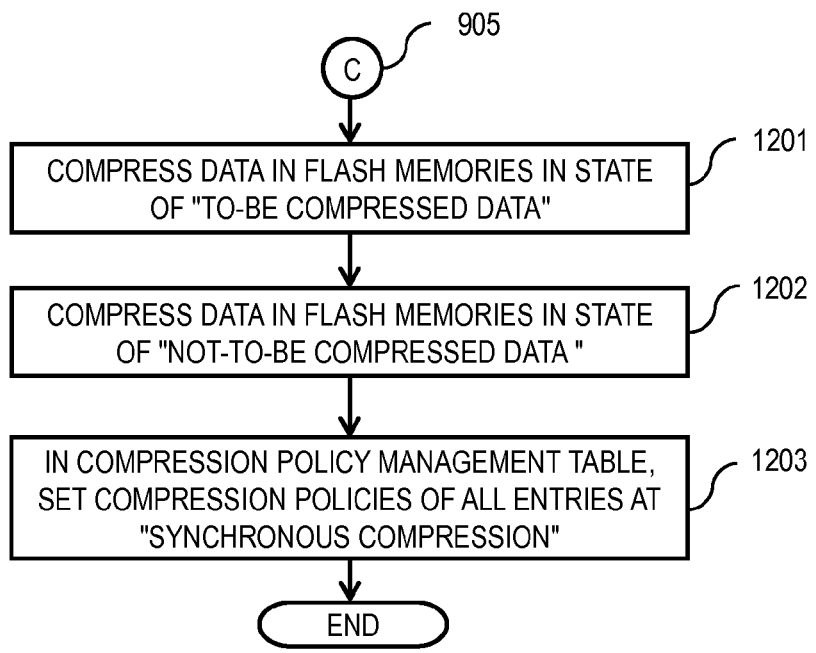
FIG. 9D is a flowchart for illustrating operation of the compression policy determination program in Embodiment 1 to redetermine compression policies when the free space percentage is less than 10%.

The flowchart of FIG. 9D depicts the operation of the compression policy determination program 115 subsequent to Step S905 in the flowchart of FIG. 9A. That is to say, the flowchart of FIG. 9D depicts the operation of the compression policy determination program 115 to redetermine the compression policies in the case where the free space percentage is less than 10%. This free space determination level is the lowest level in the size of the free space.

At Step 1201, referring to the flash memory management table 120, the compression policy determination program 115 locates the flash memories 122 included in the entry having a value of "to-be compressed data" in the flash memory state column 701 and compresses the data in the located flash memories 122. The method of compressing the data will be described later.

At Step 1202, referring to the flash memory management table 120, the compression policy determination program 115 locates the flash memories 122 included in the entry having a value of "not-to-be compressed data" in the flash memory state column 701 and compresses the data in the located flash memories 122. The method of compressing the data will be described later. This Step 1202 can be skipped.

Next, at Step 1203, the compression policy determination program 115 sets the values in the compression policy column 403 of all the entries in the compression policy management table 119 at "synchronous compression".

The foregoing operation can immediately increase the insufficient free space by immediately compressing the data in the state of "to-be compressed data". Compared to the operations depicted in FIG. 9B and FIG. 9C, this operation can further increase the free space later by setting the compression policies for all the logical address areas at "synchronous compression".

The order of the size of free space obtained by data compression is, from the largest to the smallest, synchronous compression, asynchronous compression, and no compression. The order of the load to the flash memory board 109 is, from the highest to the lowest, synchronous compression, asynchronous compression, and no compression.

When the current free space is larger, the operation described with reference to FIGS. 9A to 9D selects a change to a compression policy that increases free space more. The operation simultaneously selects a change to a compression policy that causes lower load. Such selection balances solving the shortage of space and degrading the performance appropriately.

The above-described operation immediately compresses to-be compressed data if the free space is smaller than a specified size (in the foregoing example, less than 30%) and asynchronously compresses to-be compressed data as usual if the free space is not smaller than the specified size to balance solving the shortage of space and degrading the performance appropriately.

In the operations according to the flowcharts of FIGS. 9C and 9D, the compression policy determination program 115 may estimate the free space after compression of the data in the state of "to-be compressed data" before compressing the data and compress the data by asynchronous compression as usual if the estimated free space is larger than a specified size. In the flowchart of FIG. 9B, the compression policy determination program 115 may omit the estimating the free space and immediately compress the to-be compressed data.

The compression policy determination program 115 may change the compression policies using a method different from the above-described method. For example, the compression policy determination program 115 may change the values in the compression policy column 403 of the entries including "asynchronous compression" into "synchronous compression" at the steps subsequent to Step 903.

The foregoing example uses four ranges of free space percentage; however, the ranges may be less than four or otherwise not less than five. For example, the compression policy determination program 115 may assign the default settings and other one or two combinations of settings selected from the four combinations of settings defined for the aforementioned four ranges to two or three ranges. The compression policy determination program 115 may assign only two compression policies of the aforementioned three compression policies.

Figure 10:
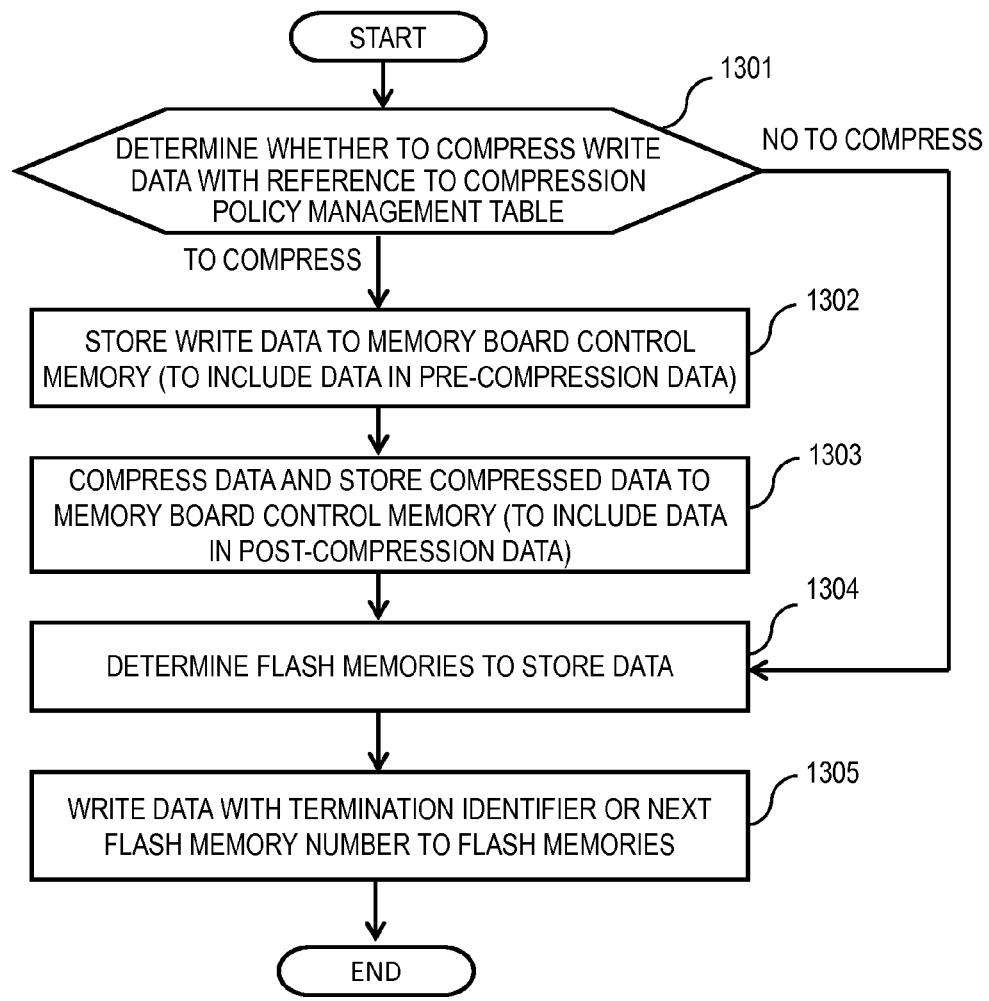
FIG. 10 is a flowchart for illustrating operation of a memory board control program in Embodiment 1 to write data to flash memories.

FIG. 10 is a flowchart of the operation of the memory board control program 124 to write data to flash memories 122. The memory board control program 124 starts the operation of the flowchart of FIG. 10 upon receipt of a data write request from the storage control program 108.

At Step 1301, the memory board control program 124 determines whether to compress the write data (user data received with the data write request) with reference to the compression policy management table 119. Specifically, the memory board control program 124 retrieves the entry including the logical address area designated by the data write request from the compression policy management table 119.

If the value of the compression policy column 403 of the entry including the designated logical address area is "synchronous compression", the memory board control program 124 determines to compress the received data immediately and store the data to the flash memories 122. If the value of the compression policy column 403 of the entry including the designated logical address area is "asynchronous compression" or "no compression", the memory board control program 124 determines to store the received data to the flash memories 122 without compressing the data.

At Step 1302, the memory board control program 124 stores the write data to the memory board control memory 112 (pre-compression data 116).

At Step 1303, the memory board control program 124 instructs the data compression program 113 to compress the pre-compression data 116 and further to store the compressed data to the memory board control memory 112 (post-compression data 117).

At Step 1304, the memory board control program 124 determines flash memories where to write the compressed user data or uncompressed user data by selecting from the flash memories in the state of "no data" according to the flash memory control table 120. The memory board control program 124 selects one or more flash memories depending on the size of the write data.

At Step 1305, the memory board control program 124 stores the user data together with a termination identifier or a next flash memory number to the flash memories selected at Step 1304.

In the case of storing user data to only one flash memory, the memory board control program 124 stores the user data and a termination identifier to the flash memory. In the case of storing user data to a plurality of flash memories, the memory board control program 124 stores user data and a termination identifier to the flash memory to store the last part of the user data and stores user data and a next flash memory number to the other flash memories.

If the designated logical address area is a logical address area already holding user data, the memory board control program 124 erases the data in the logical address area from the flash memories 122. The memory board control program 124 can determine whether the designated logical address area holds user data and locate flash memories 122 holding the user data with reference to the compressed data management table 118 and the uncompressed data management table 121.

After writing the user data to the flash memories 122, the memory board control program 124 updates the compressed data management table 118 or the uncompressed data management table 121. The memory board control program 124 further updates the flash memory management table 120.

Specifically, the memory board control program 124 associates the designated logical address area with the flash memory numbers of the flash memories that have newly stored data in the compressed data management table 118 or the uncompressed data management table 121.

The memory board control program 124 moves the numbers of the flash memories 122 that have newly stored data and the numbers of the flash memories 122 from which data has been erased within the flash memory management table 120. For example, the numbers of the flash memories holding pre-compression data in asynchronous compression should be included in the entry of "to-be compressed data".

Figure 11:
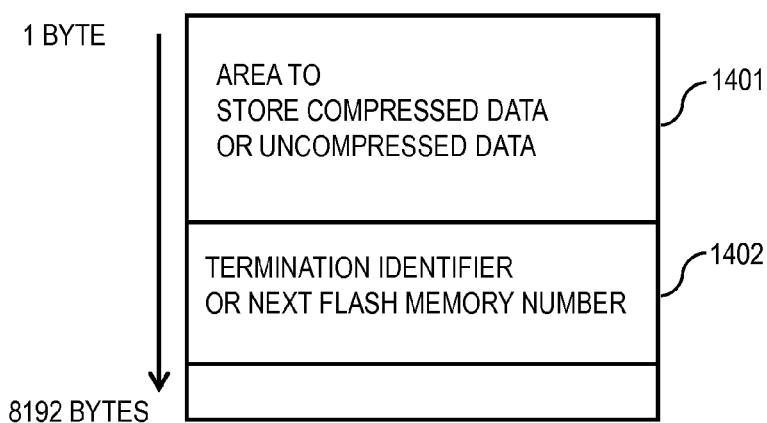
FIG. 11 is a schematic diagram for illustrating a structure of data stored in a flash memory in Embodiment 1.

FIG. 11 is a schematic diagram of data stored in a flash memory. The storage area 1401 starting from the first part of the flash memory stores compressed user data or uncompressed user data. The area 1402 following the storage area 1401 of the flash memory stores a termination identifier or a next flash memory number.

The termination identifier indicates the end of user data in one logical address area managed in the compressed data management table 118 or uncompressed data management table 121. The termination identifier indicates the last flash memory 122 holding the user data in one logical address are and further indicates the end of the user data in the last flash memory 122.

At the addresses subsequent to the termination identifier in a flash memory 122, no user data is held. As mentioned above, one flash memory 122 stores data only for one logical address area under the management; the address area subsequent to the termination identifier is an unused area.

The next flash memory number indicates the number of the flash memory holding the next part of the user data in one logical address area. The next flash memory number indicates the end of the user data in the flash memory 122. At the addresses subsequent to the next flash memory number in a flash memory 122, no user data is held. For example, the next flash memory number is stored at the last address in the flash memory 122.

Figure 12A:
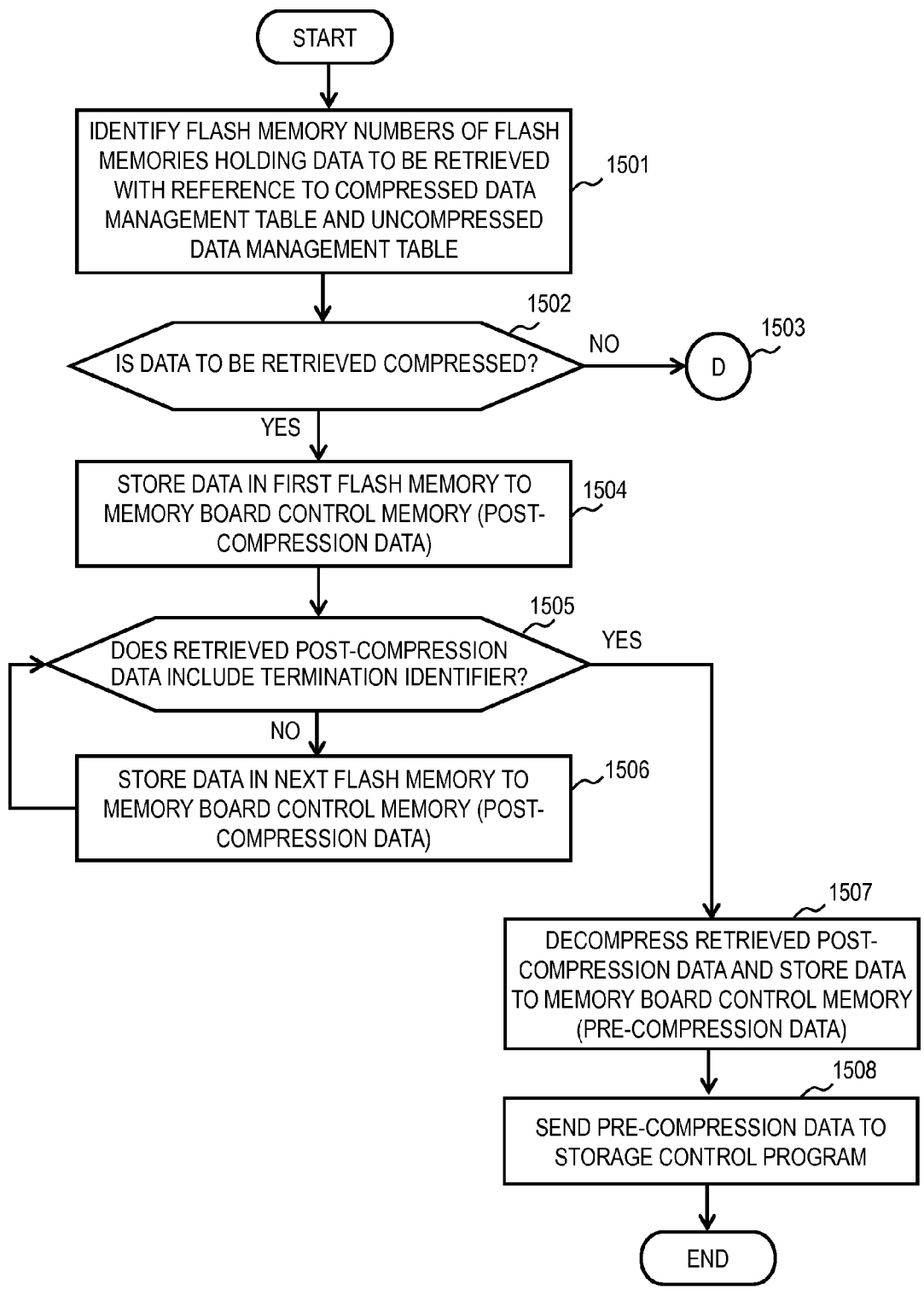
FIG. 12A is a flowchart for illustrating operation of the memory board control program in Embodiment 1 to read compressed data from flash memories.

FIG. 12A is a flowchart of a read operation of the memory board control program 124. FIG. 12A depicts the operation of the memory board control program 124 to read compressed data from flash memories 122. The memory board control program 124 starts this operation upon receipt of a read request from the storage control program 108.

At Step 1501, the memory board control program 124 identifies the numbers of flash memories holding the data for the logical address area designated by the data read request with reference to the compressed data management table 118 and the uncompressed data management table 121.

At Step 1502, the memory board control program 124 determines whether the data held in the flash memories having the identified numbers is compressed or uncompressed in accordance with the kind of the table including the identified flash memory numbers. If the data is uncompressed, the memory board control program 124 proceeds to Step 1503. The subsequent steps will be described later.

If the data is compressed, the memory board control program 124 proceeds to Step 1504. At Step 1504, the memory board control program 124 retrieves data (user data together with the termination identifier or the next flash memory number) from the first flash memory 122 listed in the entry of the designated logical address area in the compressed data management table 118 and stores the data to the memory board control memory 112 (post-compression data 117).

At Step 1505, the memory board control program 124 determines whether the newly retrieved post-compression data 117 includes a termination identifier. If the post-compression data 117 does not include a termination identifier, the memory board control program 124 proceeds to Step 1506.

At Step 1506, the memory board control program 124 acquires the next flash memory number from the post-compression data 117, retrieves data (user data together with the termination identifier or the next flash memory number) from the flash memory 122 having the acquired number, and stores the data to the memory board control memory 112 (post-compression data 117). The memory board control program 124 returns to Step 1505.

At Step 1505, if the newly retrieved post-compression data 117 includes a termination identifier, the memory board control program 124 proceeds to Step 1507. At Step 1507, the memory board control program 124 instructs the data decompression program 114 to decompress the user data in the post-compression data and to store the decompressed data to the memory board control memory 112 (pre-compression data 116).

At Step 1508, the memory board control program 124 sends the pre-compression data 116 to the storage control program 108.

Figure 12B:
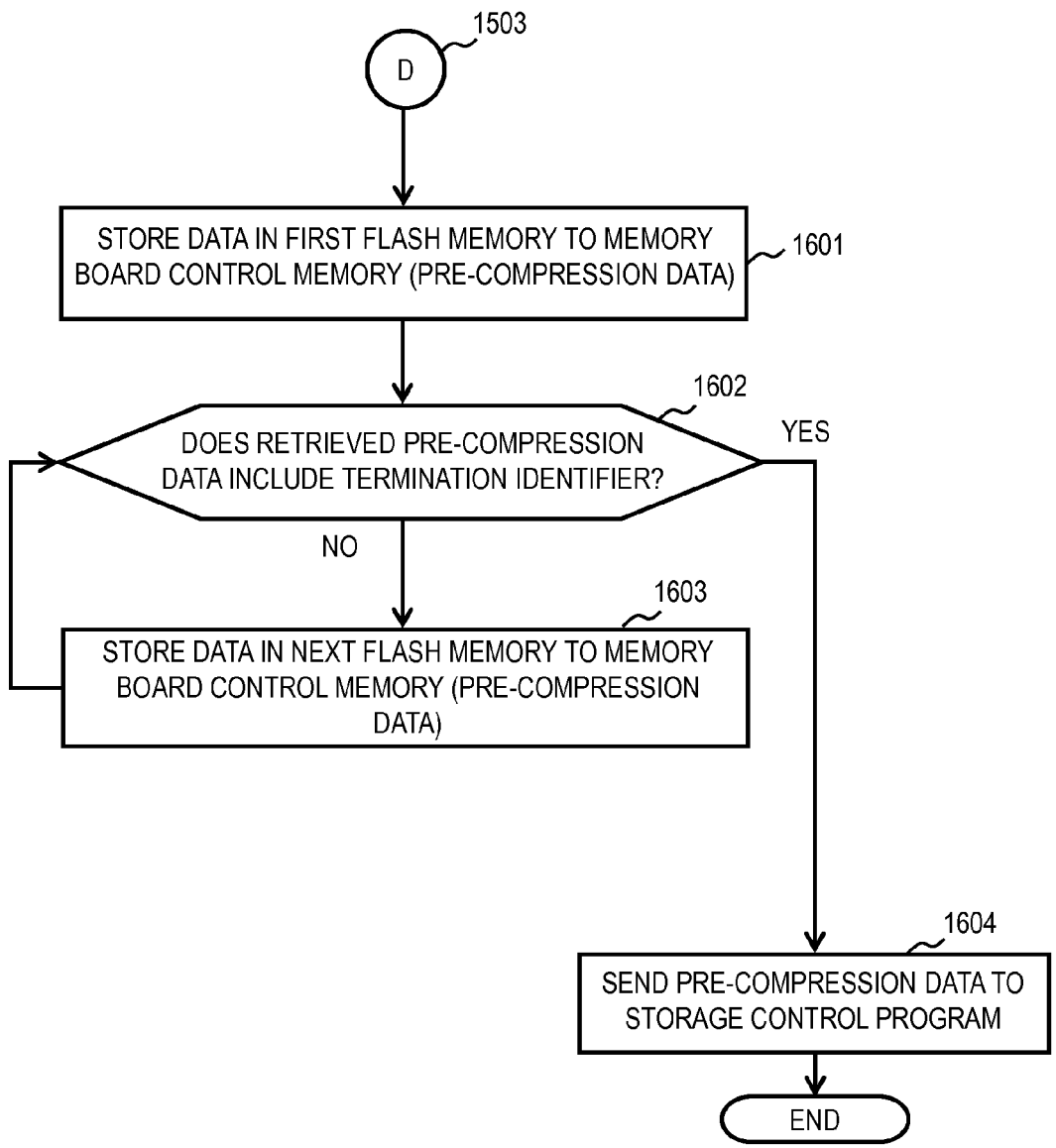
FIG. 12B is a flowchart for illustrating operation of the memory board control program in Embodiment 1 to read uncompressed data from flash memories.

FIG. 12B is a flowchart of the steps subsequent to Step 1503 in the flowchart of FIG. 12A. The flowchart of FIG. 12B depicts the operation of the memory board control program 124 to read uncompressed data.

At Step 1601, the memory board control program 124 retrieves data (user data together with the termination identifier or the next flash memory number) from the first flash memory 122 listed in the entry of the designated logical address area in the uncompressed data management table 121 and stores the data to the memory board control memory 112 (pre-compression data 116).

At Step 1602, the memory board control program 124 determines whether the newly retrieved pre-compression data 116 includes a termination identifier. If the pre-compression data 116 does not include a termination identifier, the memory board control program 124 proceeds to Step 1603.

At Step 1603, the memory board control program 124 acquires the next flash memory number from the newly retrieved pre-compression data 116, retrieves data (user data together with the termination identifier or the next flash memory number) from the flash memory 122 having the acquired number, and stores the data to the memory board control memory 112 (pre-compression data 116). Thereafter, the memory board control program 124 returns to Step 1602.

At Step 1602, if the newly retrieved pre-compression data 117 includes a termination identifier, the memory board control program 124 proceeds to Step 1604. At Step 1604, the memory board control program 124 sends the pre-compression data 116 to the storage control program 108.

As described above, the memory board control program 124 can retrieve all user data in the correct order from the flash memories 122 corresponding to the logical address area by using the termination identifier or the next flash memory number stored in each flash memory 122. The termination identifier or the next flash memory number included in each flash memory 122 eliminates the necessity of a table for collectively managing the logical addresses and the addresses in flash memories.

Figure 13:
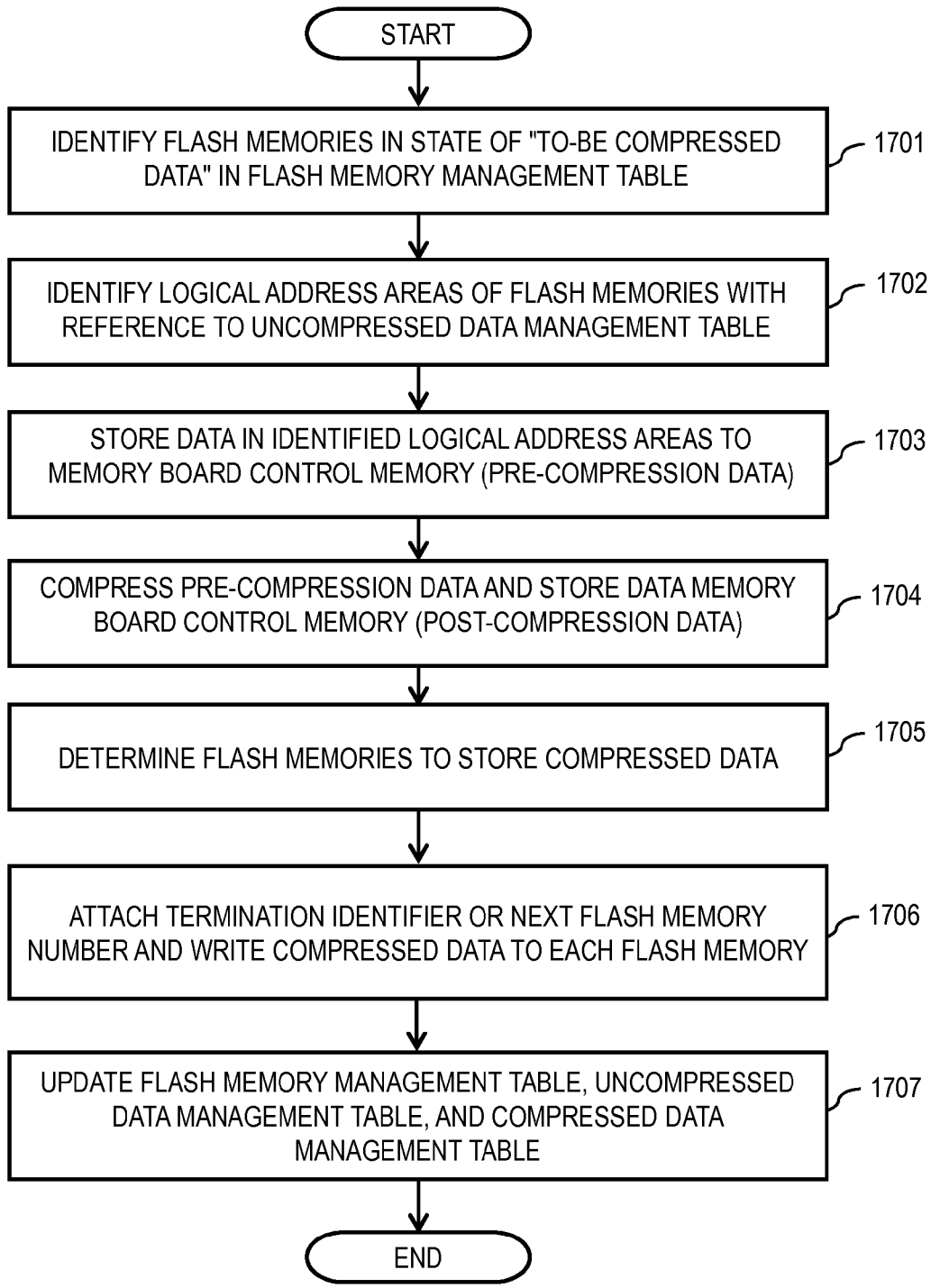
FIG. 13 is a flowchart for illustrating operation of the memory board control program in Embodiment 1 to compress to-be compressed data.

FIG. 13 is a flowchart of the operation of the memory board control program 124 to compress to-be compressed data. The memory board control program 124 starts the operation in response to an instruction at Step 1101 or Step 1201. Furthermore, the memory board control program 124 starts the operation periodically (for example, when every one minute has passed) for asynchronous compression.

At Step 1701, the memory board control program 124 identifies flash memories in the state of "to-be compressed data" with reference to the flash memory management table 120. At Step 1702, the memory board control program 124 identifies the logical address areas of the flash memories identified at Step 1701 with reference to the uncompressed data management table 121.

At Step 1703, the memory board control program 124 stores the data in the logical address areas identified at Step 1702 to the memory board control memory 112 (pre-compression data 116).

At Step 1704, the memory board control program 124 instructs the data compression program 113 to compress the pre-compression data 116 and to store the data to the memory board control memory 112 (post-compression data 117).

At Step 1705, the memory board control program 124 determines flash memories to store the compressed data 117. Specifically, the memory board control program 124 selects a required number of flash memories in the state of "no data" to store the post-compression data 117 from the flash memory management table 120.

At Step 1706, the memory board control program 124 stores user data together with a termination identifier or a next flash memory number to each of the flash memories selected at Step 1705. The method to append the termination identifier or the next flash memory number is as described with reference to the flowchart of FIG. 10. Further, the memory board control program 124 erases the data in the flash memories holding the to-be compressed data.

At Step 1707, the memory board control program 124 updates the flash memory management table 120, the uncompressed data management table 121, and the compressed data management table 118 in accordance with the processing from Step 1701 to Step 1706.

As set forth above, this embodiment enables an appropriate compression policy to be selected based on the access characteristics of data in being accessed by applications running on a server apparatus and the remaining storage area in the flash memory board. Furthermore, this embodiment prevents data fragmentation when compressed data is partially updated.

In the foregoing example, the flash memory board 109 changes the compression policy; however, the server CPU 102 may use the above-described method to change the compression policy for a logical address area based on the free space on the flash memory board 109.

The foregoing example selects one from the three compression policies of synchronous compression, asynchronous compression, and no compression (no compression is included as one of the compression policies). The flash memory board 109 may prepare a plurality of compression policies different from these three and apply one selected compression policy to the data in a logical address area. For example, the flash memory board 109 may have a plurality of compression functions using different algorithms and compress data using a selected algorithm to store the data to the flash memories 122.

The foregoing example stores a termination identifier or a next flash memory number to a flash memory 122 to be used to locate user data corresponding to a logical address area. Unlike this, the flash memory board 109 may collectively manage the relations between logical addresses and physical addresses of the flash memories in a table to locate physical addresses (user data) of the flash memories corresponding to individual logical addresses with reference to the table. Only either the termination identifiers or next flash memory numbers may be employed. If one of them is not employed, the information indicated by the other can be stored in a management table, for example.

Embodiment 2

Hereinafter, Embodiment 2 of this invention is described. The following description mostly describes differences from Embodiment 1. Embodiment 2 also determines compression policies based on the free space on the flash memory board 109. Unlike Embodiment 1, the flash memory board 109 determines compression policies based on the free-space variation rate (variation in free space per unit time). The free-space variation rate is information (value) about free space. The processing in Embodiment 2 described hereinafter can be used in place of or together with the method of changing compression policies in Embodiment 1.

Figure 14A:
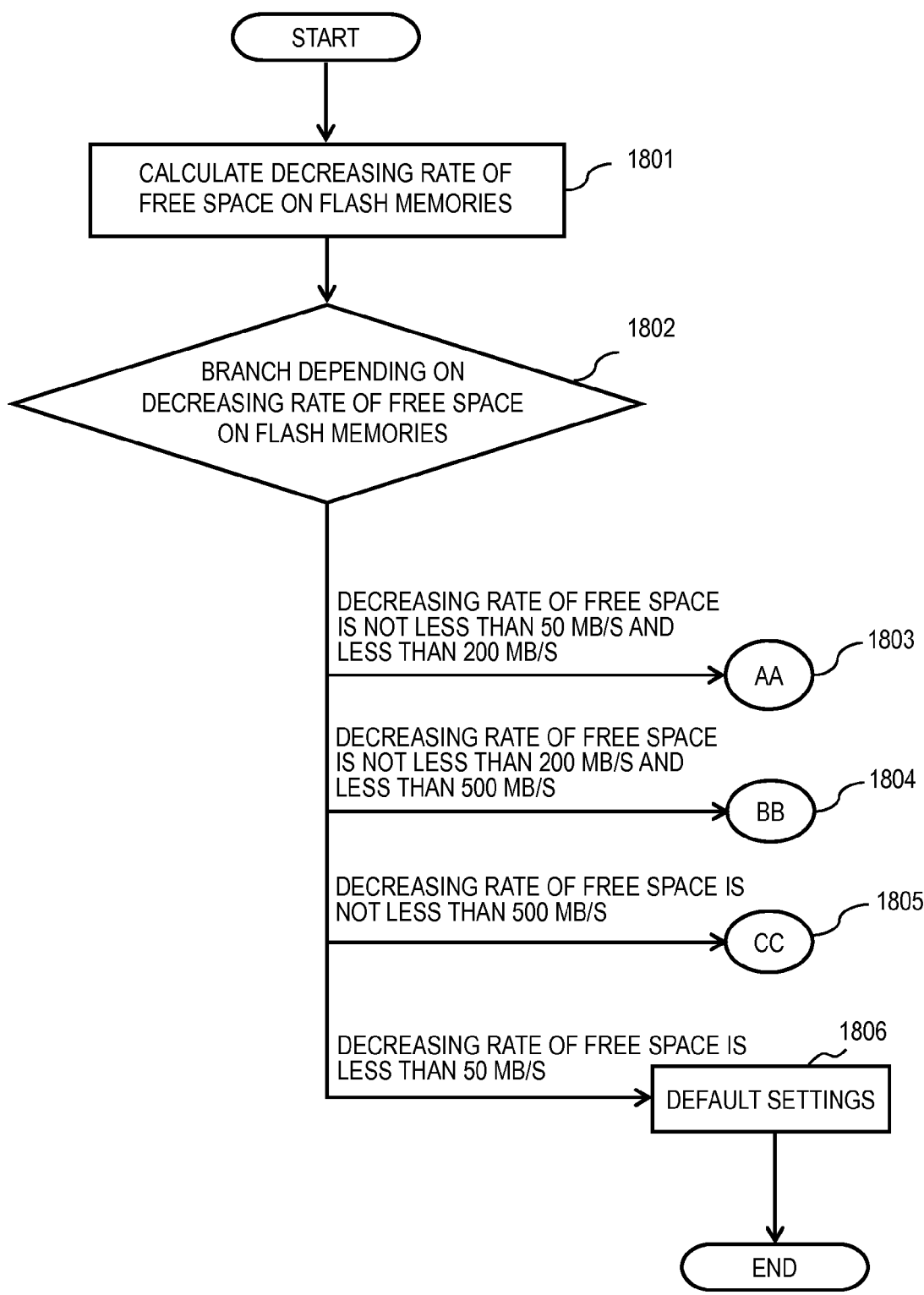
FIG. 14A is a flowchart for illustrating operation of a compression policy determination program in Embodiment 2 to redetermine compression policies based on decreasing rate of free space.

FIG. 14A is a flowchart of the operation of the compression policy determination program 115 to redetermine compression policies based on the decreasing rate (variation rate) of the free space on the flash memories. At Step 1801, the compression policy determination program 115 calculates the decreasing rate of the total free space on the plurality of flash memories 122.

Referring to the flash memory management table 120, the compression policy determination program 115 monitors the number of flash memories in the state of "no data". For example, the compression policy determination program 115 checks the number of flash memories included in the entry of "no data" in the flash memory management table 120 at every minute.

In this example, each flash memory 122 has a fixed capacity, for example 8 KB. The compression policy determination program 115 can calculate the decreasing rate of the free space based on the number of flash memory numbers in the entry of "no data". The flash memories 122 may have different capacities if information associating flash memory numbers with the capacities is provided.

Next, at Step 1802, the compression policy determination program 115 proceeds to a different step based on the decreasing rate of the free space calculated at Step 1801. If the decreasing rate is not less than 50 MB and less than 200 MB per second, the compression policy determination program 115 proceeds to Step 1803. If the decreasing rate is not less than 200 MB and less than 500 MB per second, the compression policy determination program 115 proceeds to Step 1804.

If the decreasing rate is not less than 500 MB per second, the compression policy determination program 115 proceeds to Step 1805. If the decreasing rate is less than 50 MB per second (including the case where the free space increases), the compression policy determination program 115 executes Step 1806 and exits this flowchart. Step 1806 is the same as Step 906 in FIG. 9A. It should be noted that these criteria are an example.

Figure 14B:
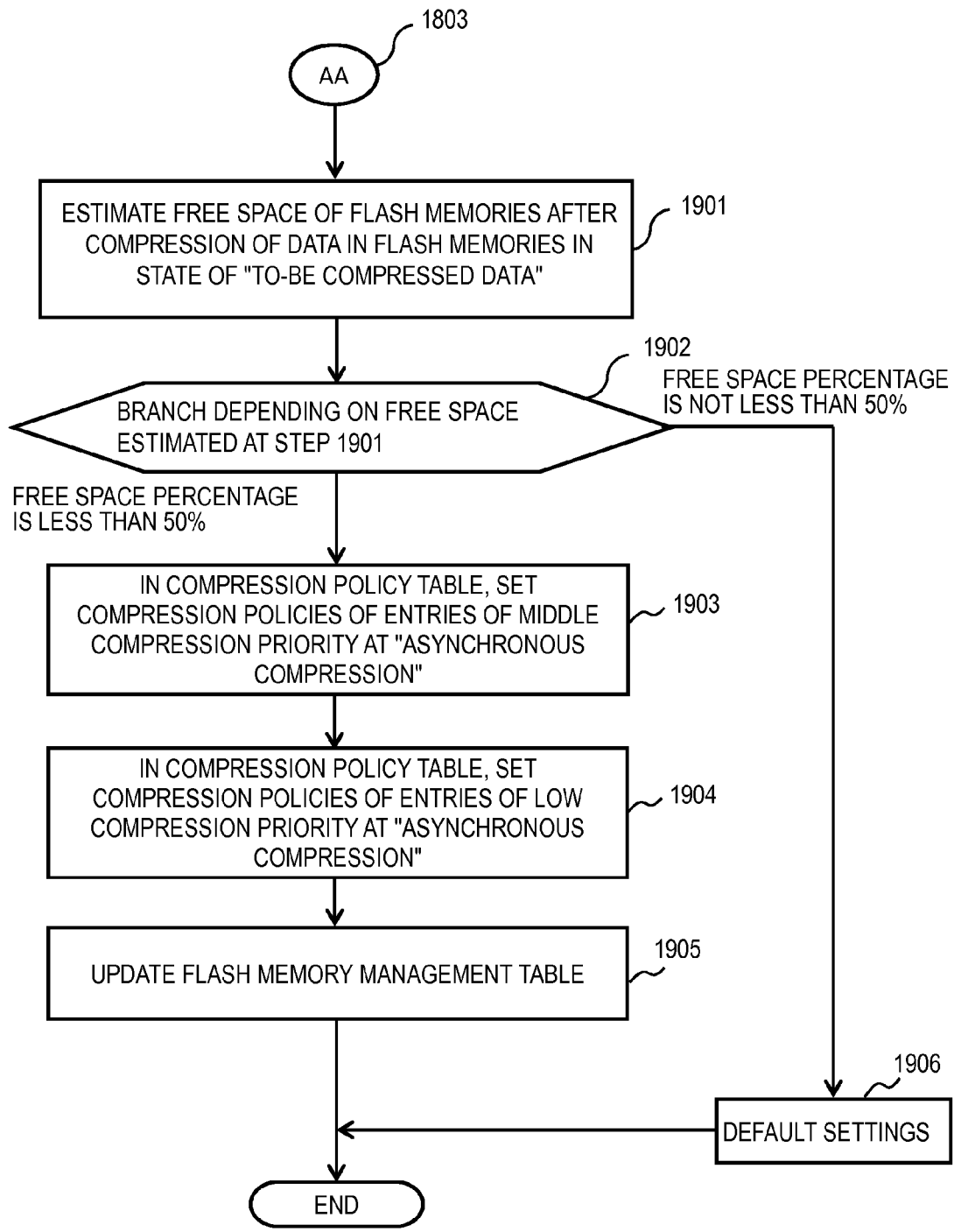
FIG. 14B is a flowchart for illustrating operation of the compression policy determination program to redetermine compression policies in Embodiment 2 when the decreasing rate of free space is 50 MB/s to 200 MB/s.

FIG. 14B is a flowchart of the steps subsequent to Step 1803 in the flowchart of FIG. 14A. That is to say, FIG. 14B is a flowchart of the operation of the compression policy determination program 115 in the case where the decreasing rate of the free space is not less than 50 MB and less than 200 MB per second. Steps 1901 to 1906 are respectively the same as Steps 1001 to 1006 in the flowchart of FIG. 9B.

Figure 14C:
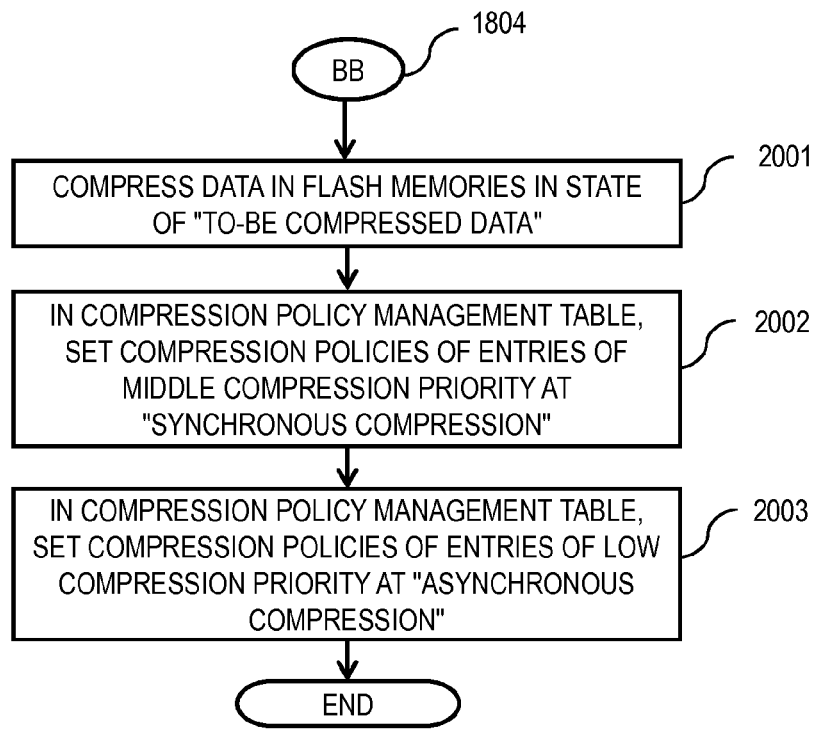
FIG. 14C is a flowchart for illustrating operation of the compression policy determination program to redetermine compression policies in Embodiment 2 when the decreasing rate of free space is 200 MB/s to 500 MB/s.

FIG. 14C is a flowchart of the steps subsequent to Step 1804 in the flowchart of FIG. 14A. That is to say, FIG. 14C is a flowchart of the operation of the compression policy determination program 115 in the case where the decreasing rate of the free space is not less than 200 MB and less than 500 MB per second. Steps 2001 to 2003 are respectively the same as Steps 1101 to 1103 in the flowchart of FIG. 9C.

Figure 14D:
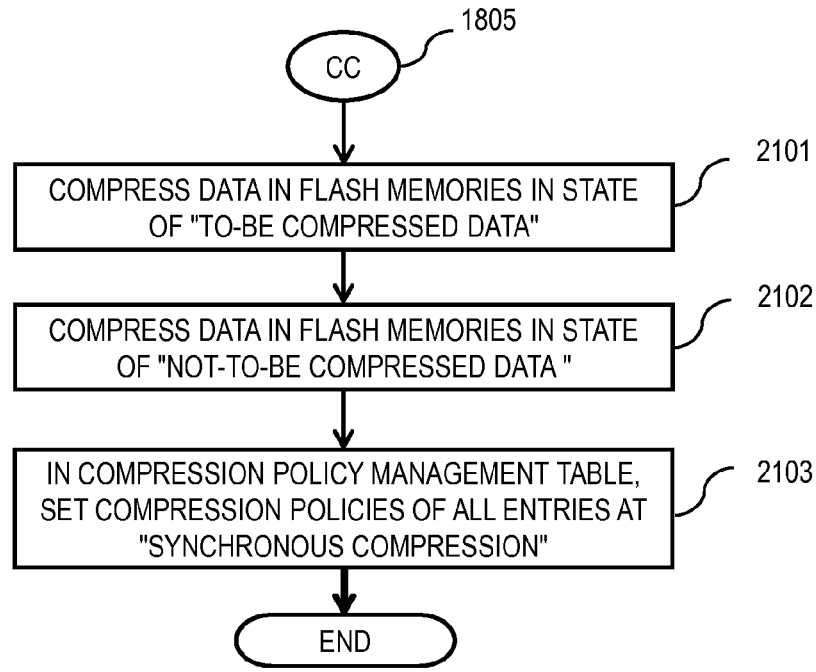
FIG. 14D is a flowchart for illustrating operation of the compression policy determination program to redetermine compression policies in Embodiment 2 when the decreasing rate of free space is higher than 500 MB/s.

FIG. 14D is a flowchart of the steps subsequent to Step 1805 in the flowchart of FIG. 14A. That is to say, FIG. 14D is a flowchart of the operation of the compression policy determination program 115 in the case where the decreasing rate of the free space is not less than 500 MB per second. Steps 2101 to 2103 are respectively the same as Steps 1201 to 1203 in the flowchart of FIG. 9D.

As set forth above, determining the compression policies depending on the decreasing rate of the free space on the flash memory board 109 can prevent shortage of the free space on the flash memory board 109.

This invention is not limited to the above-described embodiments but includes various modifications. The above-described embodiments are explained in detail for better understanding of this invention and are not limited to those including all the configurations and elements described above. A part of the configuration of an embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs for providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A memory device comprising:
a controller; and
a plurality of randomly accessible memories that are configured to store user data from a host,
the controller including:
data management information managing correspondence relations between address areas to be designated by the host and the plurality of memories; and
compression policy management information managing associations of the address areas to be designated by the host with priorities in compressing user data to be stored in the plurality of memories,
wherein the controller is configured to determine a compression policy associated with a designated address area included in an access request from the host based on a priority associated with the designated address area and information on free space of the plurality of memories,
wherein the information on free space of the plurality of memories is a value indicating the free space of the plurality of memories,
the controller is configured to assign a compression policy selected from a plurality of compression policies including synchronous compression, asynchronous compression, and no compression to each of the address areas in the compression policy management information based on the priorities and the value indicating the free space,
wherein, in the default settings, the synchronous compression, the asynchronous compression, and the no compression are assigned a first priority, a second priority, and a third priority, respectively,
wherein a plurality of ranges are defined for the value indicating the free space,
wherein the controller is configured to use the default settings in a case where the value indicating the free space is included in a first range, and
wherein the controller is configured to assign the synchronous compression to the first priority and to assign the asynchronous compression to the second priority and the third priority in a case where the value indicating the free space is included in a second range in which the free space is smaller than in the first range.

2. The memory device according to claim 1, wherein the controller is configured to store data indicating a position of a last part of user data in the address area designated by the host to a memory to store the last part of the user data.

3. The memory device according to claim 2,
wherein when the user data for the address area designated by the host is to be stored in memories selected from the plurality of memories, the controller is configured to store an identifier of a next memory to each of the memories other than the memory to store the last part of the user data.

4. The memory device according to claim 1, wherein the controller is configured to assign the synchronous compression to the first priority and the second priority and to assign the asynchronous compression to the third priority in a case where the value indicating the free space is included in a third range in which the free space is smaller than in the second range.

5. The memory device according to claim 4, wherein the controller is configured to assign the synchronous compression to the first priority, the second priority, and the third priority in a case where the value indicating the free space is included in a fourth range in which the free space is smaller than in the third range.

6. The memory device according to claim 1, wherein the controller is configured to assign the synchronous compression to the first priority and the second priority and to assign the asynchronous compression to the third priority in a case where the value indicating the free space is included in a second range in which the free space is smaller than in the first range.

7. The memory device according to claim 1, wherein the controller is configured to assign the synchronous compression to the first priority, the second priority, and the third priority in a case where the value indicating the free space is included in a second range in which the free space is smaller than in the first range.

8. The memory device according to claim 1, wherein the controller is configured to compress user data to be compressed in a case where the value indicating the free space is included in a second range in which the free space is smaller than in the first range.

9. The memory device according to claim 1, wherein the controller is configured to estimate the value indicating the free space after user data to be compressed is compressed in a case where the value indicating the free space is included in a second range in which the free space is smaller than in the first range and to use the default settings in a case where the estimated value indicating the free space is included in the first range.

10. The memory device according to claim 1, wherein the information on free space of the plurality of memories is a value indicating a decreasing rate of the free space of the plurality of memories.

11. A computer system comprising:
a system processor;
a system main memory; and
the memory device according to claim 1,
wherein the system processor is configured to send information for associating the address areas to be designated with the values of the priorities to the memory device, and
wherein the system processor is configured to send an access request including a designated address area to the memory device.

12. A method of controlling a memory device including a controller and a plurality of randomly accessible memories configured to store user data from a host,
the memory device including:
data management information managing correspondence relations between address areas to be designated by the host and the plurality of memories; and
compression policy management information managing associations of the address areas to be designated by the host with priorities in compressing user data to be stored in the plurality of memories,
the method comprising:
receiving an access request including a designated address area from the host; and
determining a compression policy for the designated address area included in the access request based on a priority for the designated address area and information on free space of the plurality of memories,
wherein the information on free space of the plurality of memories is a value indicating the free space of the plurality of memories,
wherein the controller is configured to assign a compression policy selected from a plurality of compression policies including synchronous compression, asynchronous compression, and no compression to each of the address areas in the compression policy management information based on the priorities and the value indicating the free space,
wherein, in the default settings, the synchronous compression, the asynchronous compression, and the no compression are assigned a first priority, a second priority, and a third priority, respectively,
wherein a plurality of ranges are defined for the value indicating the free space,
wherein the controller is configured to use the default settings in a case where the value indicating the free space is included in a first range, and
wherein the controller is configured to assign the synchronous compression to the first priority and to assign the asynchronous compression to the second priority and the third priority in a case where the value indicating the free space is included in a second range in which the free space is smaller than in the first range.

* * * * *